(12) United States Patent
Yamada et al.

(10) Patent No.: US 11,030,761 B2
(45) Date of Patent: Jun. 8, 2021

(54) INFORMATION PROCESSING DEVICE, IMAGING DEVICE, APPARATUS CONTROL SYSTEM, MOVABLE BODY, INFORMATION PROCESSING METHOD, AND COMPUTER PROGRAM PRODUCT

(71) Applicants: Yuu Yamada, Kanagawa (JP); Jun Yoshida, Tokyo (JP); Yohichiroh Ohbayashi, Kanagawa (JP); Hiroki Kubozono, Kanagawa (JP); Daisuke Okada, Kanagawa (JP); Shintaroh Kida, Kanagawa (JP); Sukehiro Kimura, Kanagawa (JP); Tabito Suzuki, Tokyo (JP)

(72) Inventors: Yuu Yamada, Kanagawa (JP); Jun Yoshida, Tokyo (JP); Yohichiroh Ohbayashi, Kanagawa (JP); Hiroki Kubozono, Kanagawa (JP); Daisuke Okada, Kanagawa (JP); Shintaroh Kida, Kanagawa (JP); Sukehiro Kimura, Kanagawa (JP); Tabito Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 16/347,938

(22) PCT Filed: Nov. 2, 2017

(86) PCT No.: PCT/JP2017/039780
§ 371 (c)(1),
(2) Date: May 7, 2019

(87) PCT Pub. No.: WO2018/100971
PCT Pub. Date: Jun. 7, 2018

(65) Prior Publication Data
US 2019/0295281 A1    Sep. 26, 2019

(30) Foreign Application Priority Data

Nov. 30, 2016 (JP) .............................. JP2016-232556
Sep. 6, 2017 (JP) .............................. JP2017-171243

(51) Int. Cl.
*G06T 7/593* (2017.01)
*G06T 7/70* (2017.01)
(Continued)

(52) U.S. Cl.
CPC ................ *G06T 7/593* (2017.01); *B60R 1/00* (2013.01); *G06K 9/00791* (2013.01);
(Continued)

(58) Field of Classification Search
CPC . G06T 7/593; G06T 7/70; G06T 2207/30252; G06T 2207/10028;
(Continued)

(56) References Cited

U.S. PATENT DOCUMENTS

2008/0118149 A1* 5/2008 Fu ...................... G06K 9/00805
                                                            382/174
2011/0074957 A1* 3/2011 Kiyohara ............... G06K 9/342
                                                            348/148

(Continued)

FOREIGN PATENT DOCUMENTS

EP    2 551 794 A2    1/2013
EP    2 958 054 A2    12/2015
(Continued)

OTHER PUBLICATIONS

International Search Report and Written Opinion dated Apr. 17, 2018 in PCT/JP2017/039780 filed on Nov. 2, 2017.

(Continued)

*Primary Examiner* — Nimesh Patel
(74) *Attorney, Agent, or Firm* — Oblon, McClelland, Maier & Neustadt, L.L.P.

(57) ABSTRACT

An information processing device includes an image analyzing unit. The image analyzing unit includes an object region setting unit configured to set an object region, for image information obtained by capturing an imaging range, the object region corresponding to an object existing in the imaging range; a luminance information acquiring unit (Continued)

configured to acquire luminance information indicating luminance in the imaging range; and a correcting unit configured to correct the object region based on the luminance information in a luminance detection region set in a lower part of the object region.

11 Claims, 13 Drawing Sheets

(51) Int. Cl.
*H04N 13/239* (2018.01)
*B60R 1/00* (2006.01)
*G06K 9/00* (2006.01)
*B60W 30/09* (2012.01)

(52) U.S. Cl.
CPC ............ *G06K 9/00805* (2013.01); *G06T 7/70* (2017.01); *H04N 13/239* (2018.05); *B60R 2300/107* (2013.01); *B60R 2300/301* (2013.01); *B60W 30/09* (2013.01); *B60W 2420/42* (2013.01); *B60W 2554/80* (2020.02); *B60W 2710/18* (2013.01); *B60W 2710/20* (2013.01); *B60W 2720/10* (2013.01); *G06K 2209/21* (2013.01); *G06K 2209/23* (2013.01); *G06T 2207/20072* (2013.01); *G06T 2207/30252* (2013.01)

(58) Field of Classification Search
CPC ........... G06T 11/60; G06T 2207/10004; G06T 2207/20076; G06T 5/006; G06T 7/32; G06T 7/579; G06T 2207/30244; G06T 7/20; G06T 7/277; G06T 7/521; G06T 7/73; G06T 7/74; G06T 19/006; G06T 1/00; G06T 2207/30261; G06T 3/4038; G06T 17/05; G06T 2207/20221; G06T 7/50; G06T 2207/10052; G06T 2207/20072; G06K 9/00805; G06K 9/00791; G06K 9/00845; G06K 9/00798; G06K 9/00825; G06K 9/00; G06K 9/4638; G06K 9/6202; G06K 9/3258; G06K 9/4652; G06K 9/3233; G06K 2209/23; G06K 9/00671; G06K 9/2063; G06K 9/4661; G06K 2209/21; G06K 9/4647; H04N 13/239; B60R 1/00; B60R 23/107; B60R 2300/301; B60R 2300/302; B60R 11/04; B60R 2021/01259; B60R 2300/50; B60R 2300/8093; B60R 2021/0104; B60R 2300/103; B60R 2300/106; B60R 2300/602; B60R 2300/8053; B60W 2554/80; B60W 30/09; B60W 2420/42; B60W 2710/18; B60W 2710/20; B60W 2720/10; B60W 30/08; B60W 30/12; B60W 30/16; B60W 2554/00; B60W 50/14; B60W 30/085; B60W 30/095; B60K 2370/1868; B60K 2370/195; B60K 2370/1529; B60K 2370/175; B60K 2370/179; B60K 37/06; B60T 2201/02; B60T 2201/08; B60T 2201/089; B60T 2201/12; B60T 8/17558; B60T 8/3275; B60T 8/4818; B60T 2201/024; B60T 2201/085; B60T 2210/20; B60T 2210/24; B60T 7/12; B60T 7/22; B60T 2210/32; B60T 2201/022; B60T 17/22; H04K 1/10; H04K 2203/22; H04K 3/90; H04W 4/025; H04W 4/029; H04W 4/14; H04W 4/90; H04W 4/024; H04W 4/80; G08B 19/00; G08B 25/008; G08B 25/14; G08B 21/0269; G08B 25/016; G08B 25/08; G08B 25/12; G08B 27/005; G06F 1/1632; G06F 1/1635; G06F 3/048; G06F 3/013; G06F 3/017; G06F 3/011; G06F 3/0446; G06F 3/1423; H04M 1/7253; H04M 1/72541; H04M 2242/04; H04M 3/42348; H04M 3/5116; G08G 1/096716; G08G 1/096725; G08G 1/096775; G08G 1/164; G08G 1/205; G08G 1/16; G08G 1/166; G08G 1/167; G08G 1/0962; G08G 1/143; G08G 1/09; G08G 1/0969; G08G 1/165; G06N 3/08; G06N 20/00; G06N 3/04; G06N 3/0418; G06N 3/0454; G06N 3/084; G09G 3/3426; G09G 5/38; G09G 2370/022; G09G 2370/16; G09G 2380/10; G09G 3/002; G09G 3/003; G09G 5/003; G09G 5/14

See application file for complete search history.

(56) References Cited

U.S. PATENT DOCUMENTS

| | | | |
|---|---|---|---|
| 2012/0242835 A1 | 9/2012 | Li et al. | |
| 2014/0098196 A1* | 4/2014 | Guan | G06K 9/4638 348/47 |
| 2015/0116336 A1* | 4/2015 | Yoshimura | G09G 5/006 345/520 |
| 2015/0161881 A1* | 6/2015 | Takemura | G06K 9/00798 348/148 |
| 2015/0294160 A1 | 10/2015 | Takahashi et al. | |
| 2015/0298621 A1 | 10/2015 | Katoh | |
| 2016/0014406 A1 | 1/2016 | Takahashi et al. | |
| 2016/0019429 A1 | 1/2016 | Ishigaki et al. | |
| 2016/0277397 A1 | 9/2016 | Watanabe | |
| 2017/0041784 A1 | 2/2017 | Watanabe | |
| 2017/0297491 A1* | 10/2017 | Tanaka | B60R 1/002 |
| 2019/0005691 A1 | 1/2019 | Takahashi et al. | |

FOREIGN PATENT DOCUMENTS

| | | | |
|---|---|---|---|
| JP | 3430641 B2 | 5/2003 | |
| JP | 4754434 B2 | 6/2011 | |
| JP | 2016-29557 A | 3/2016 | |
| JP | 5971341 B2 | 7/2016 | |
| WO | WO 2017/159082 A1 | 9/2017 | |

OTHER PUBLICATIONS

Broggi, A. et al., "Multi-Resolution Vehicle Detection using Artificial Vision". Intelligent Vehicles Symposium. IEEE Parma, Italy Jun. 14-17, 2004, pp. 310-314.

* cited by examiner

[Fig. 1]
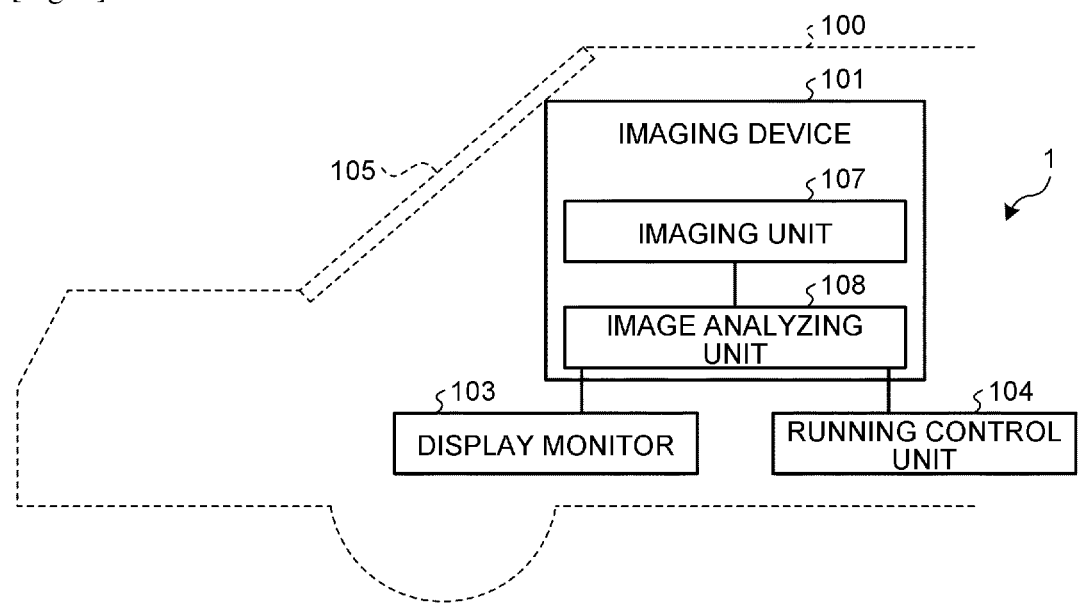

[Fig. 2]
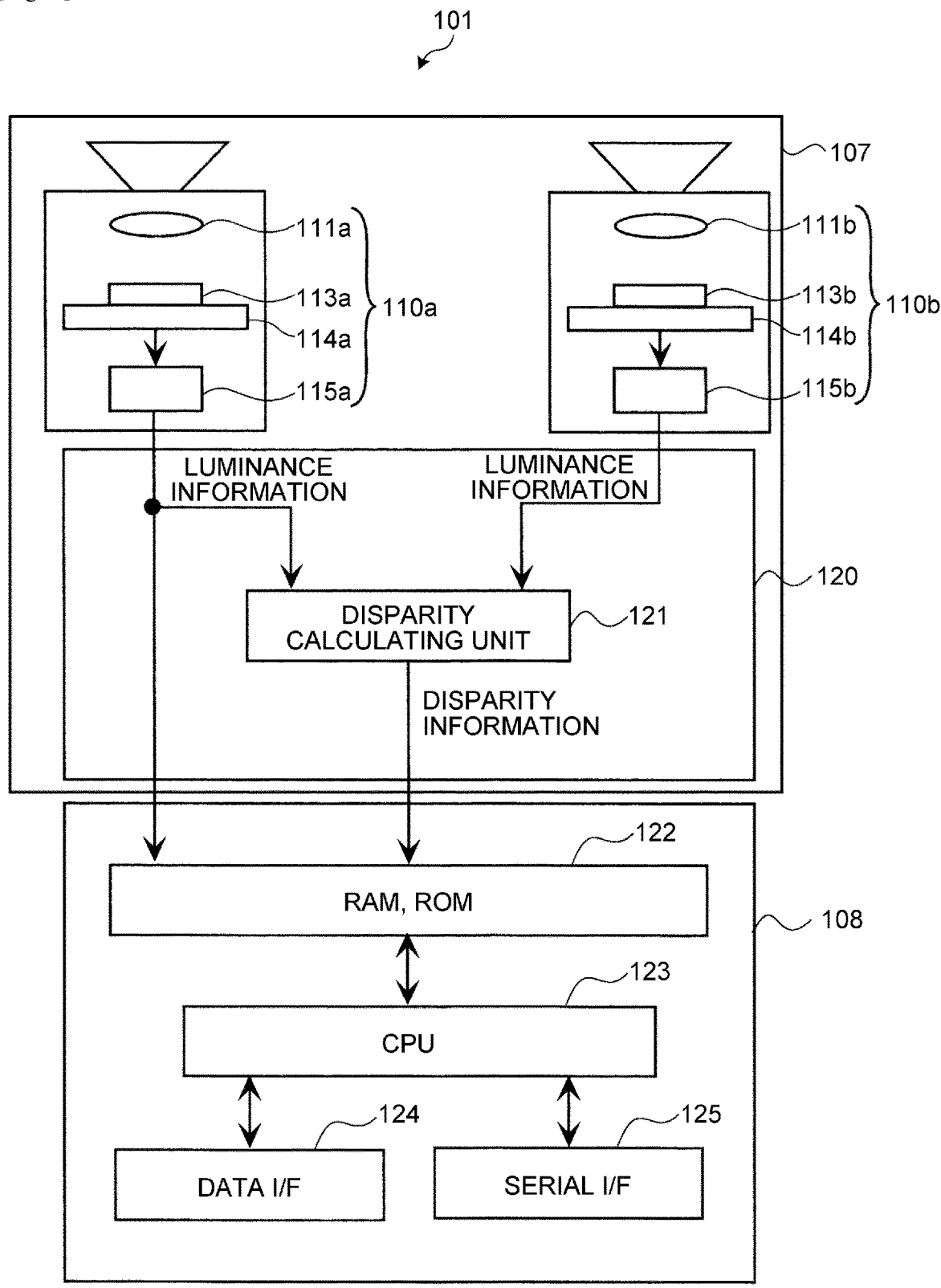

[Fig. 3]
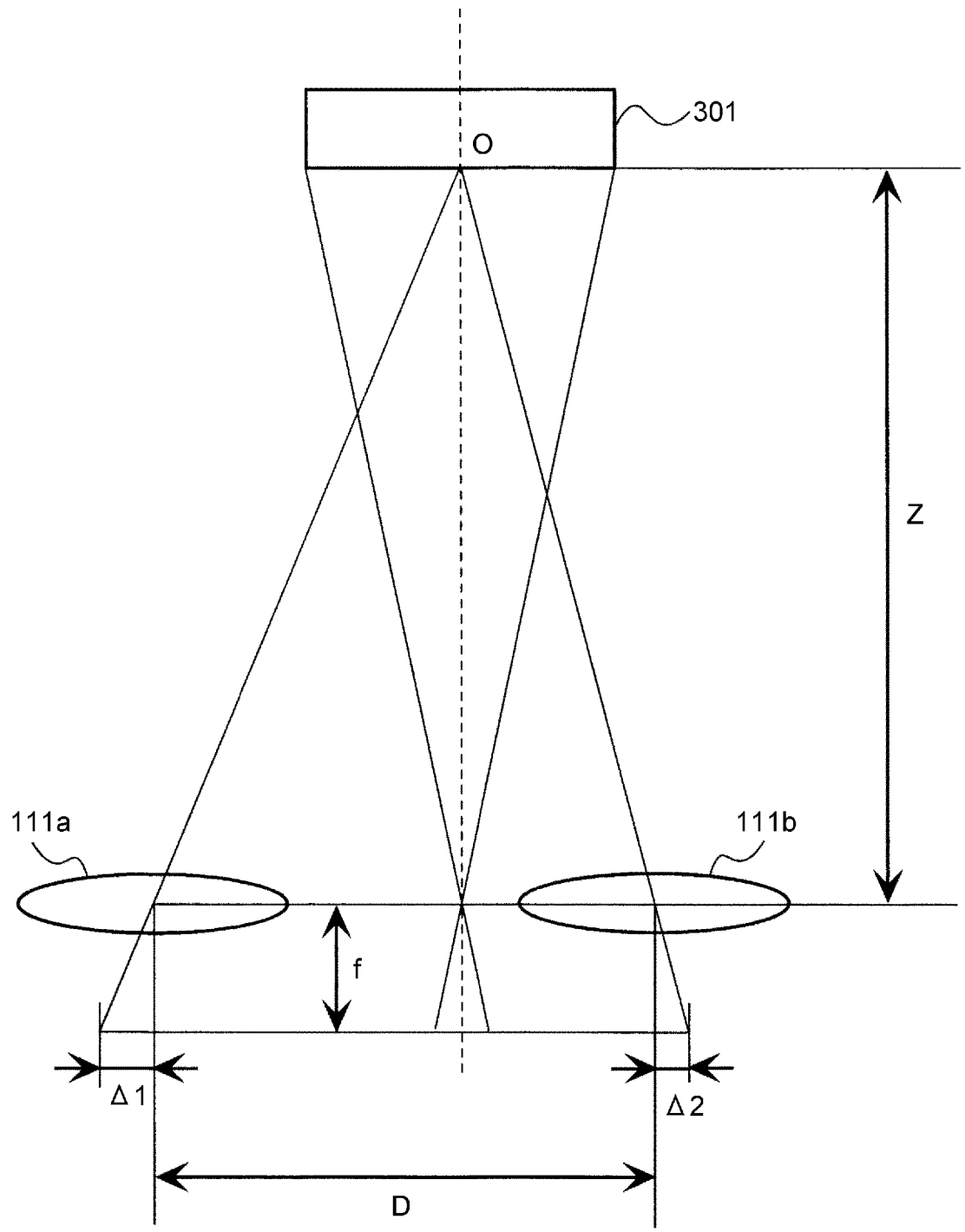

[Fig. 4]
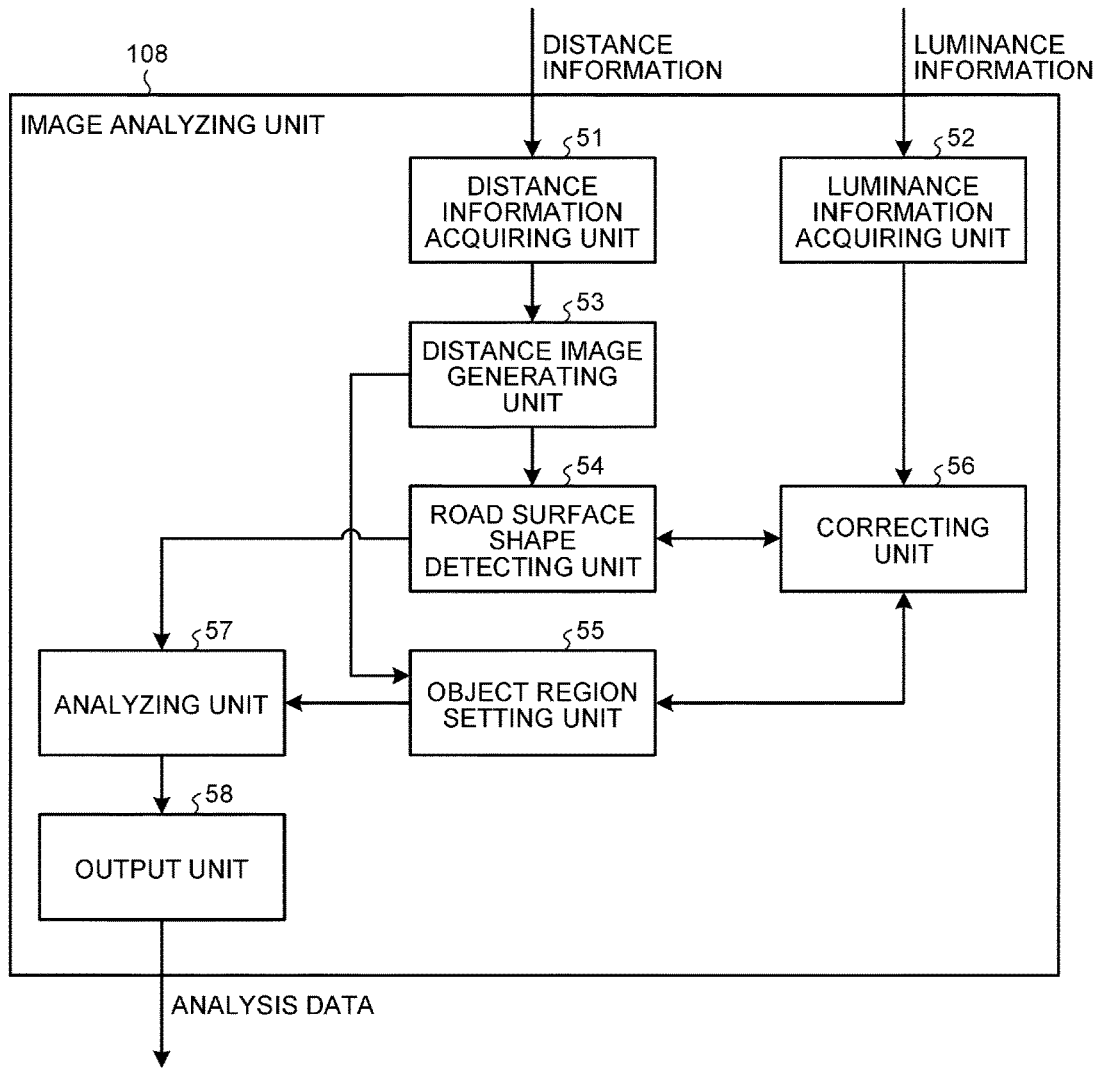
[Fig. 5]
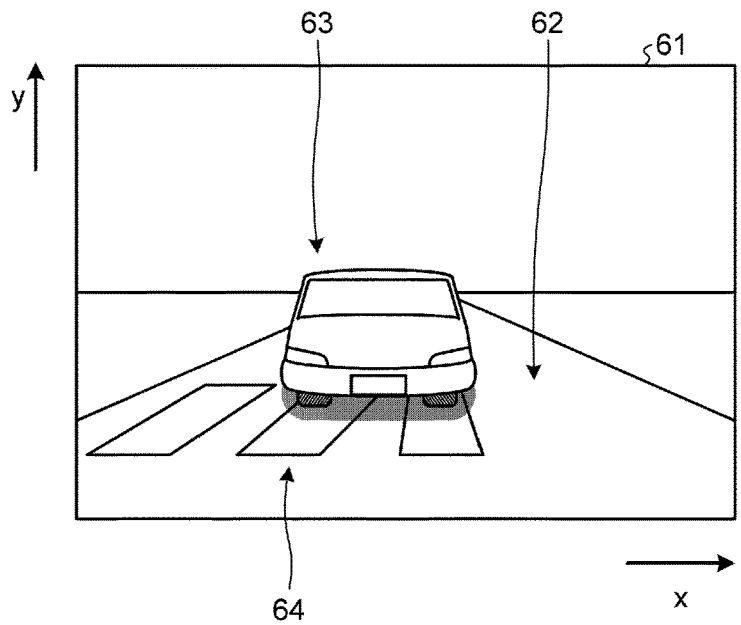

[Fig. 6]
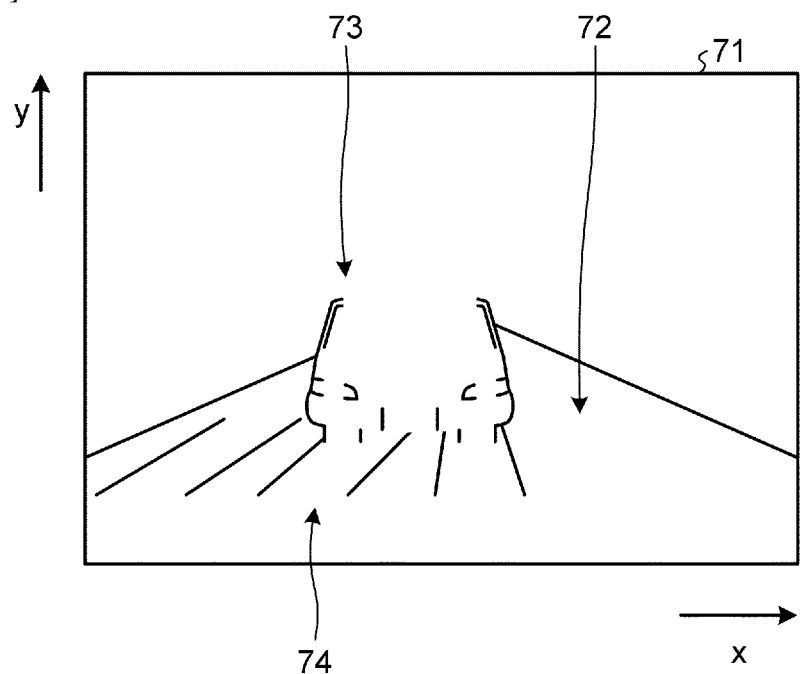
[Fig. 7]
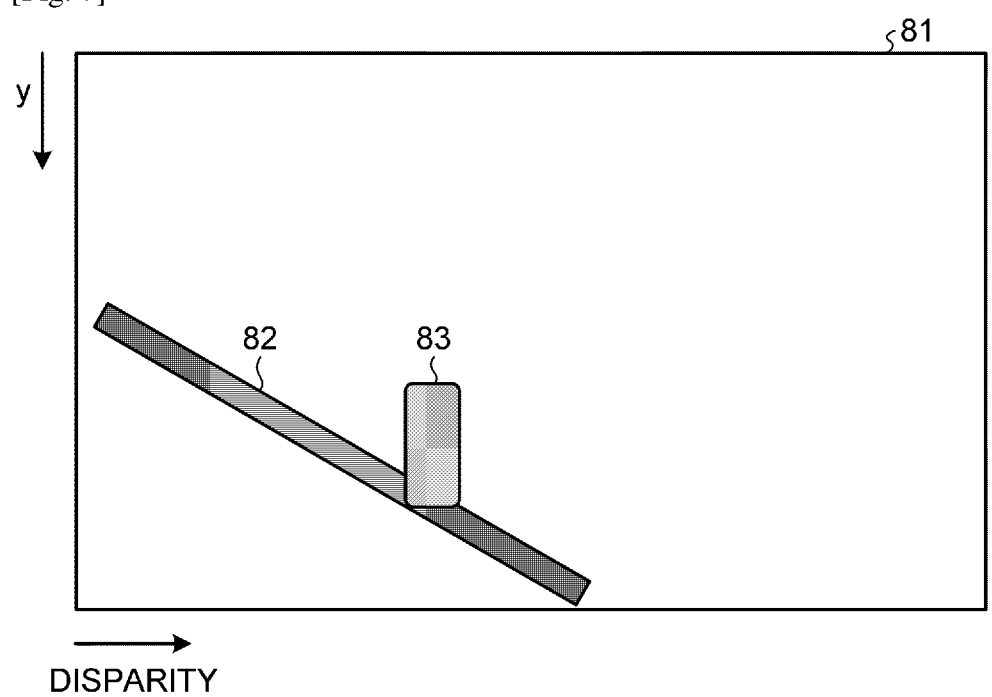

[Fig. 8]
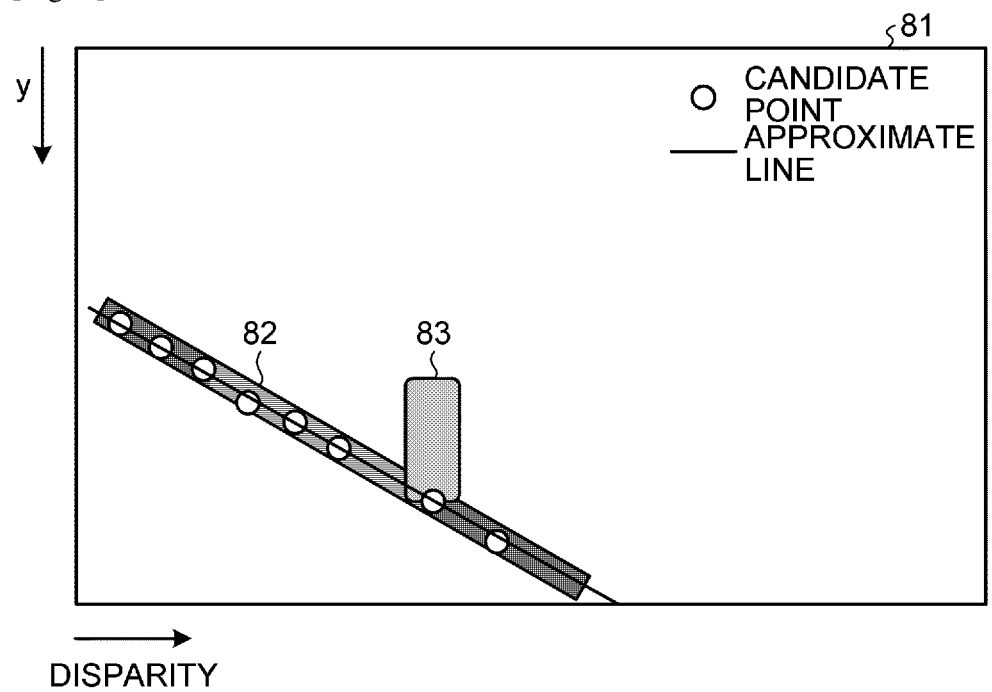
[Fig. 9]
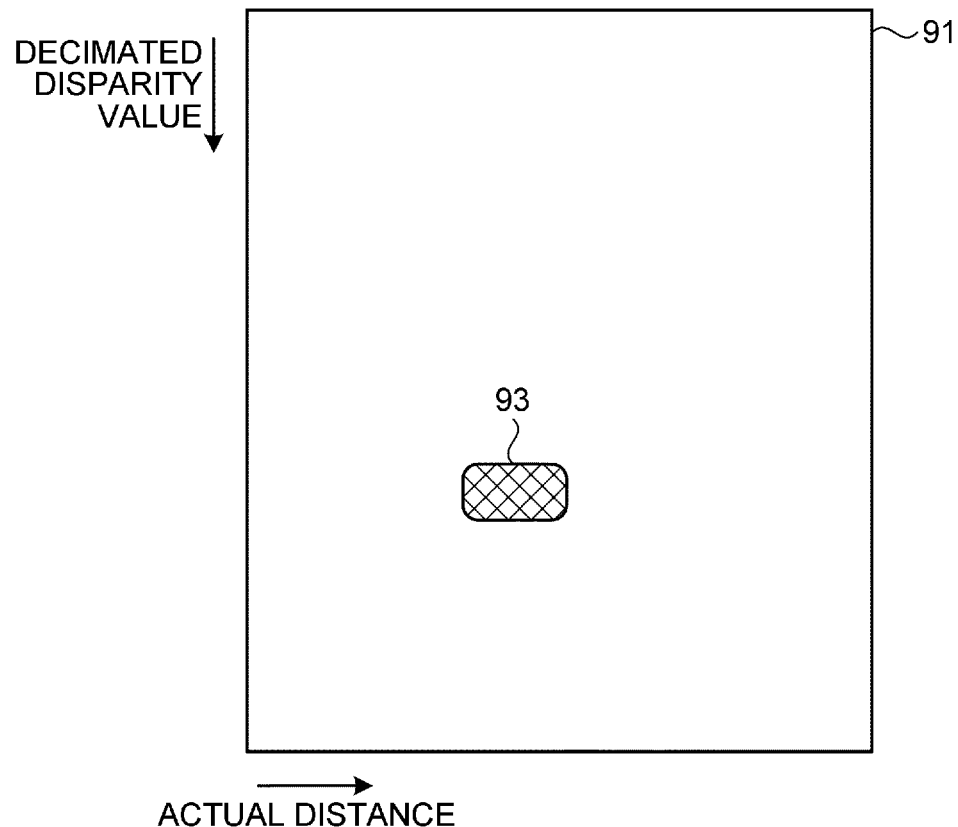

[Fig. 10]
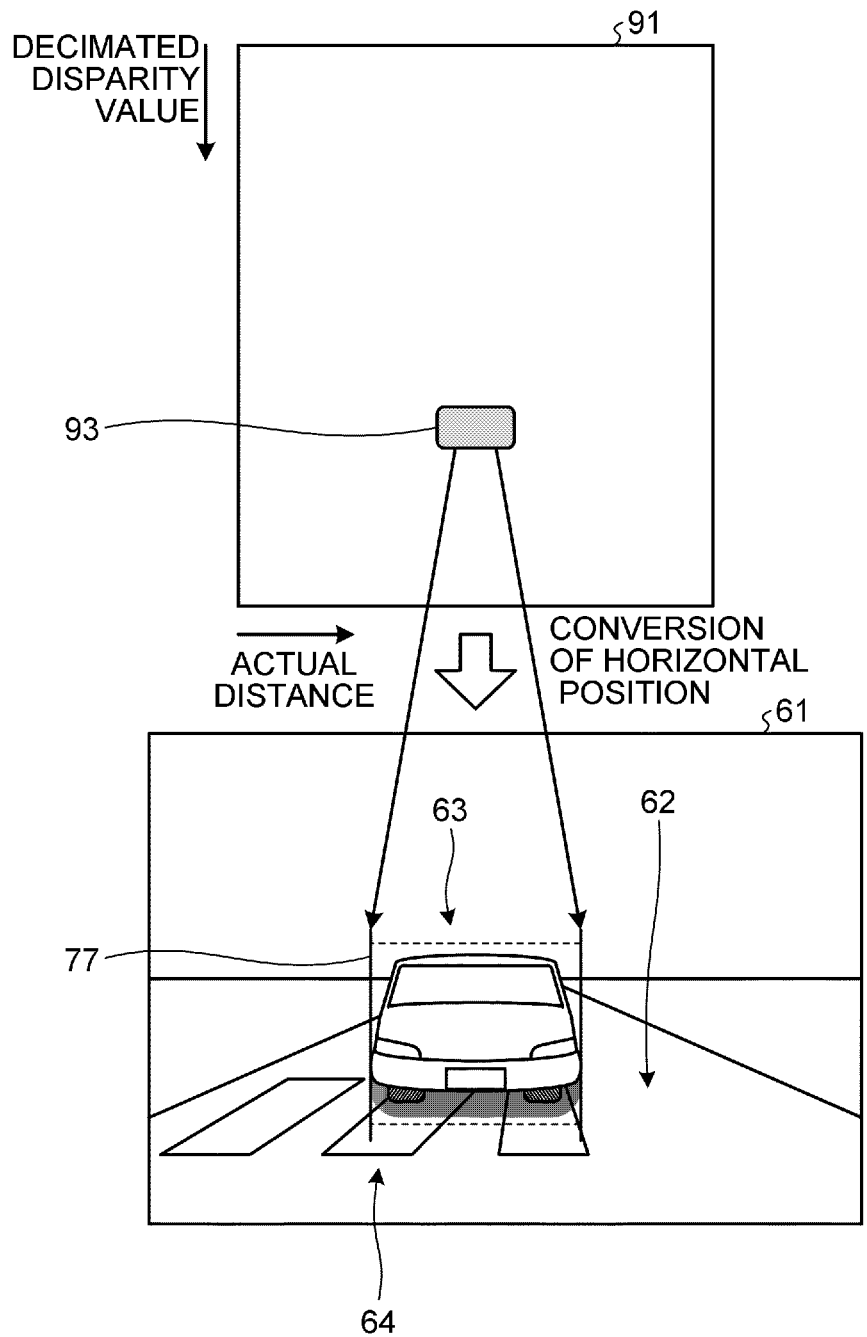

[Fig. 11]
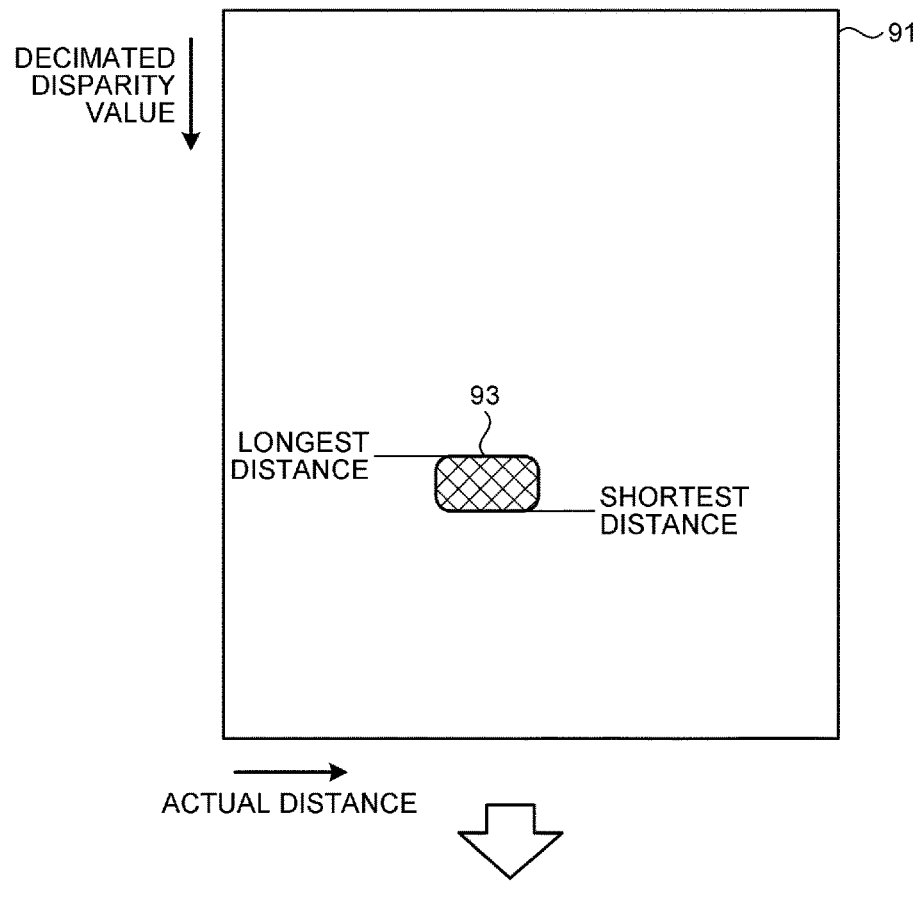
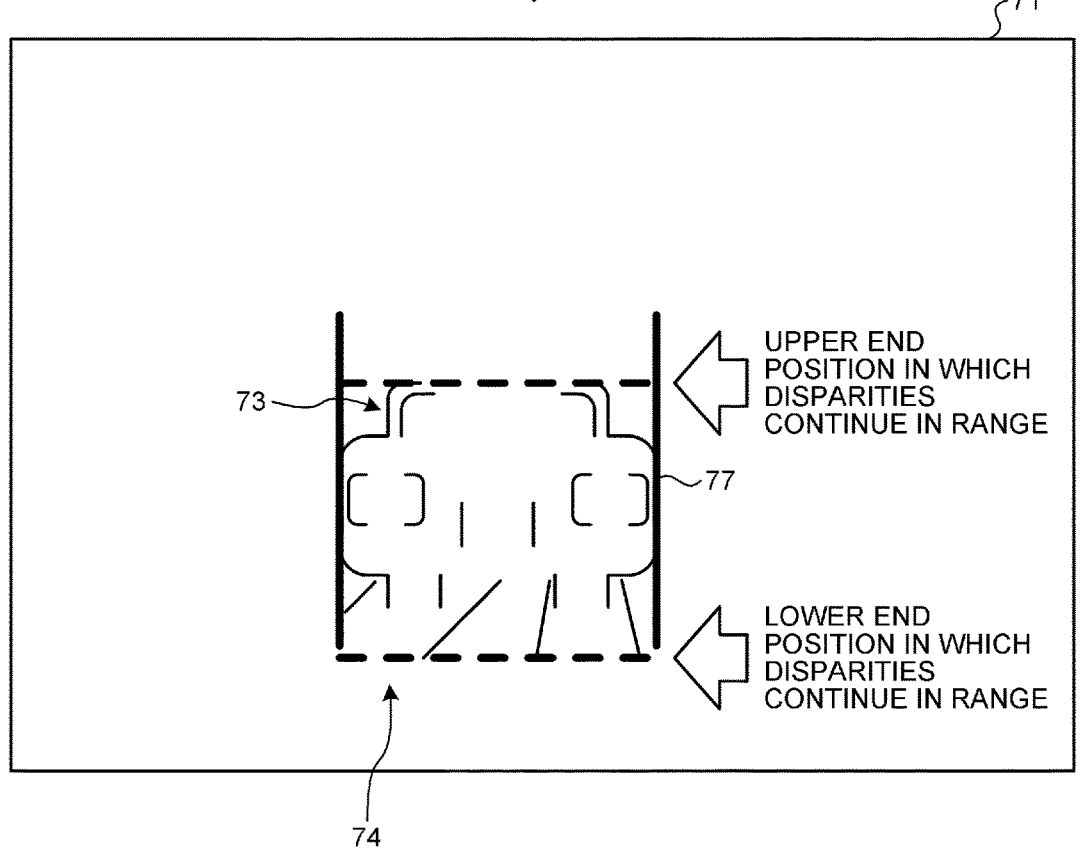

[Fig. 12]
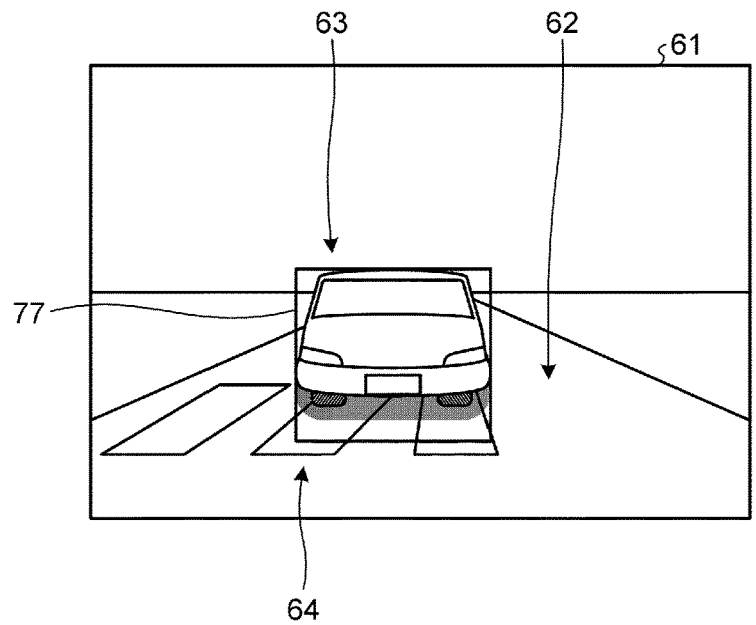
[Fig. 13]
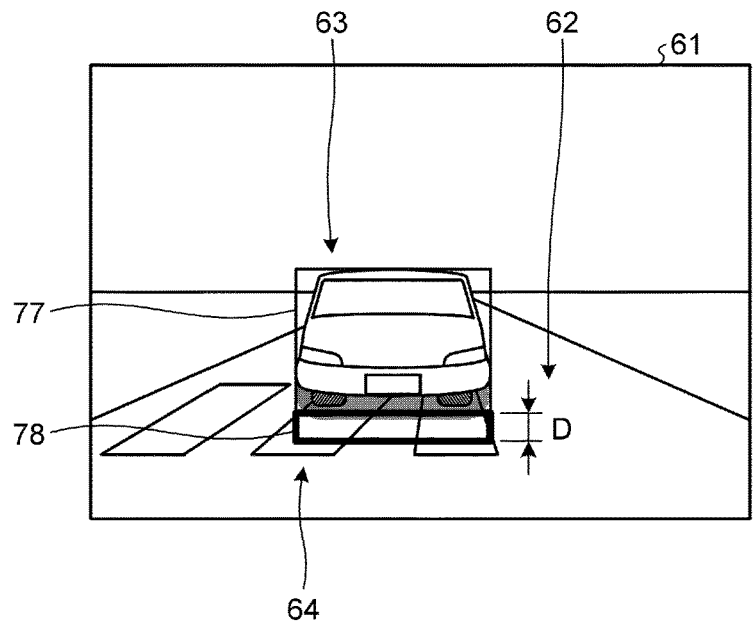
[Fig. 14]
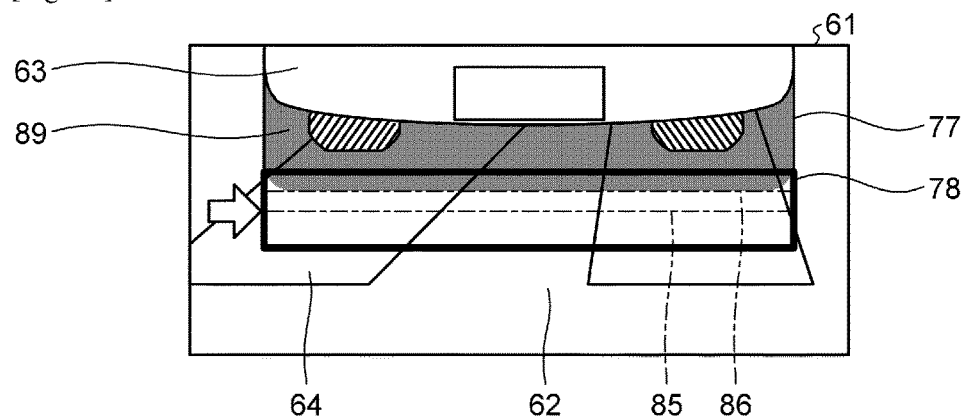

[Fig. 15]
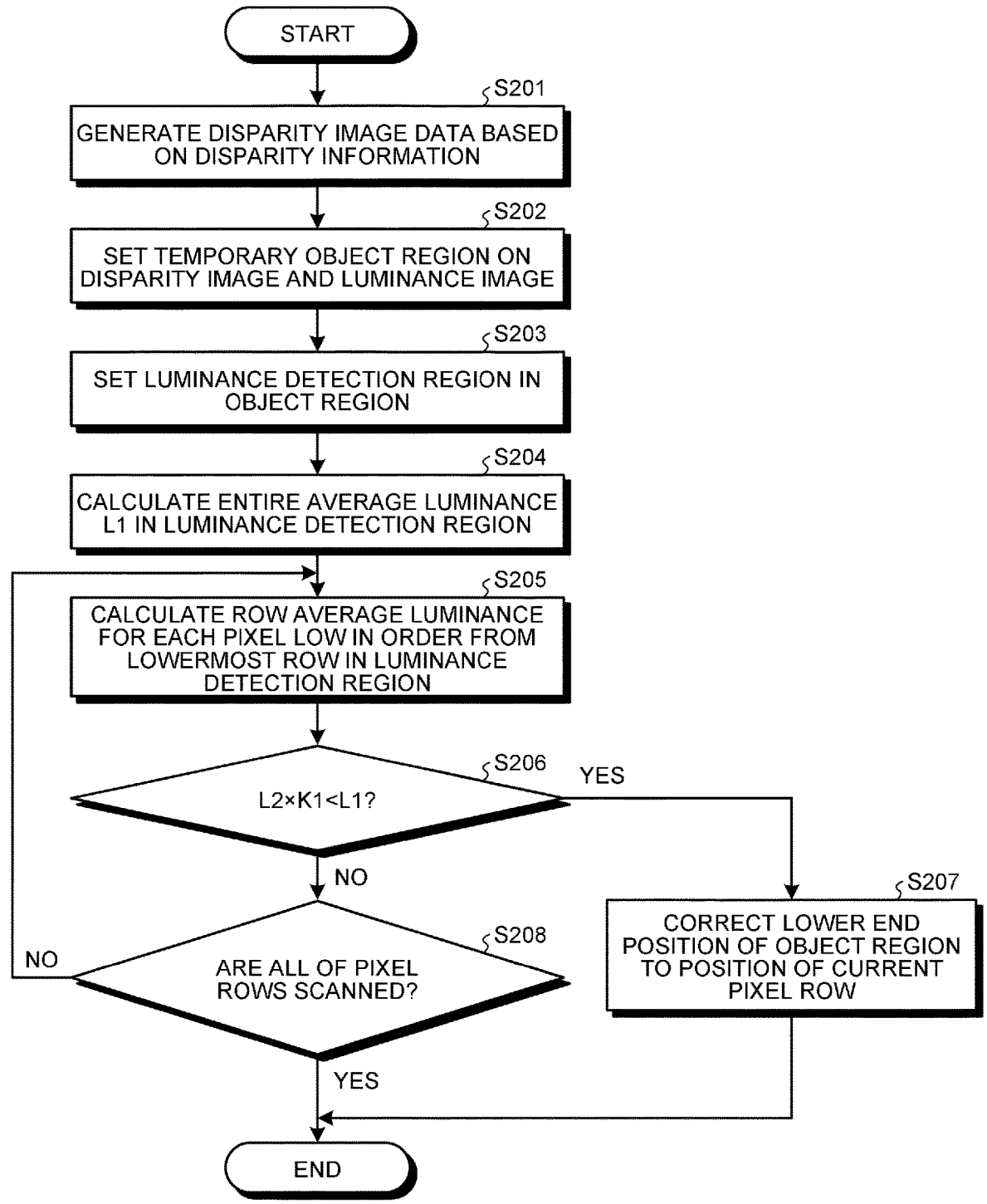

[Fig. 16]
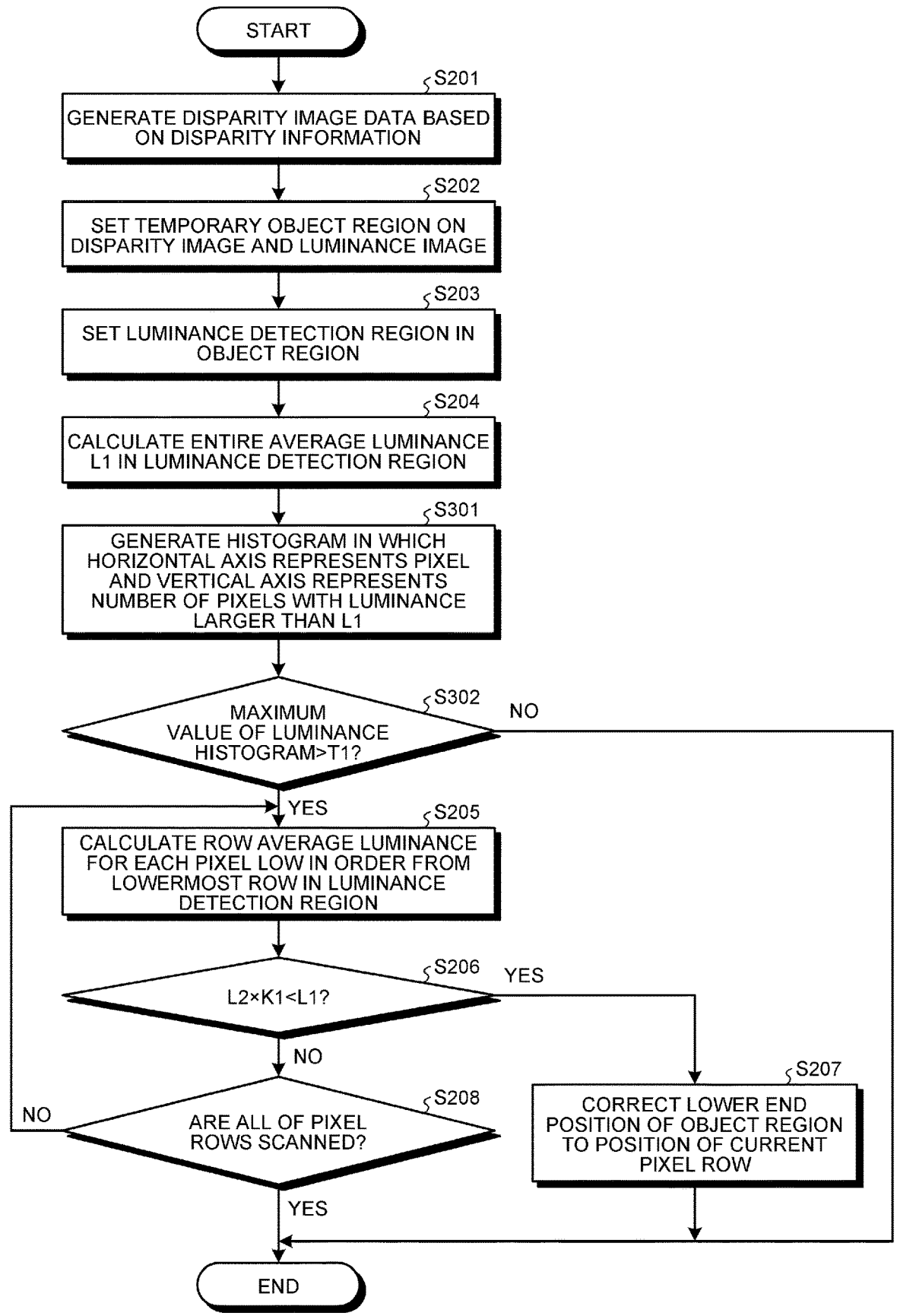

[Fig. 17]
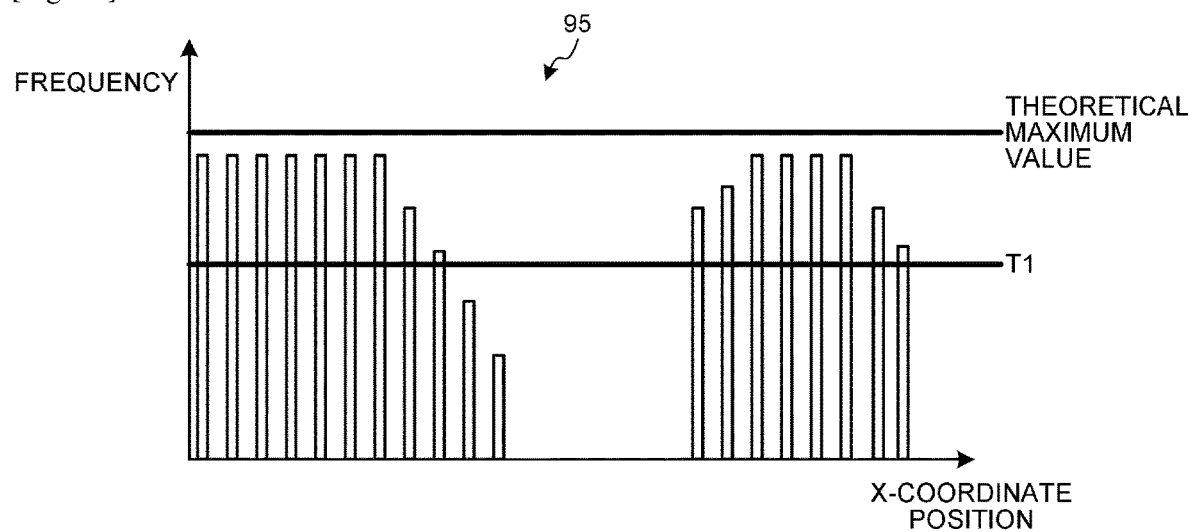
[Fig. 18]
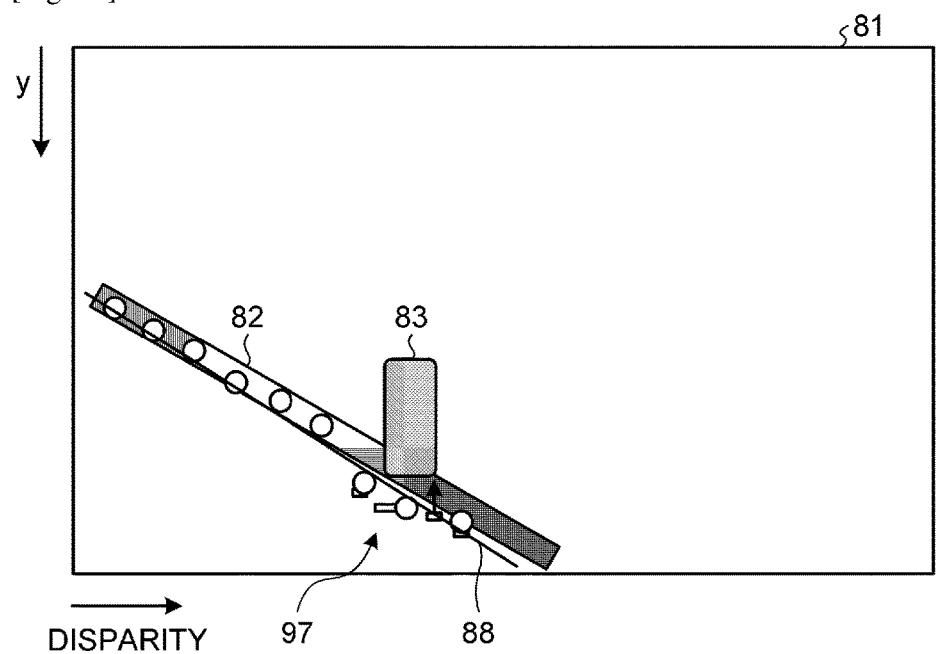

[Fig. 19]
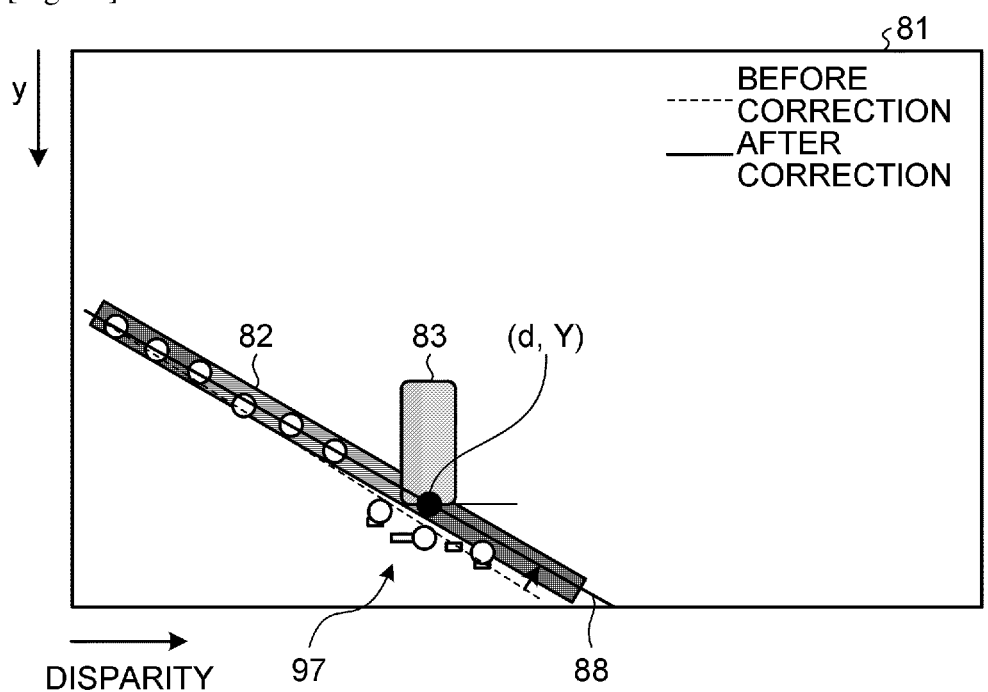

INFORMATION PROCESSING DEVICE, IMAGING DEVICE, APPARATUS CONTROL SYSTEM, MOVABLE BODY, INFORMATION PROCESSING METHOD, AND COMPUTER PROGRAM PRODUCT

TECHNICAL FIELD

The present invention relates to an information processing device, an imaging device, an apparatus control system, a movable body, an information processing method, and a computer program product.

BACKGROUND ART

Conventionally, for the safety of automobiles, automotive body structures or the like have been developed in terms of how to save a pedestrian and protect an occupant when the pedestrian and an automobile crash into each other. However, in recent years, with the advancement of an information processing technology and an image processing technology, a technology to detect a person and an automobile at a high speed is being developed. By applying these technologies, an automobile that prevents an occurrence of a crash by automatically putting a brake before the automobile hits an object has already been developed. In automatic vehicle control, it is necessary to accurately measure a distance to an object, such as a person or some other vehicle; therefore, distance measurement using a millimeter wave radar or a laser radar, distance measurement using a stereo camera, and the like have been put to practical use.

If a distance is measured by using a stereo camera, it is possible to generate a disparity image (a distance image) based on an amount of deviation (disparity) between local regions captured by left and right cameras, and measure a distance between an object as a target for collision avoidance or the like and a subject vehicle. In this case, it is possible to recognize a position, a size, or the like of the object through a clustering process of detecting a group of pixels indicating similar distances (with similar disparity values) as a single object. That is, through the clustering process based on a disparity or information that can be handled synonymously with the disparity (for example, information on a distance acquired by using a millimeter wave radar, a laser radar, or the like), a region corresponding to the object is set in a distance image (disparity image) or a luminance image.

For example, to obtain movement information on a target object with high accuracy in an object detection device that detects the target object from a subject vehicle or the like and in a drive support device that performs a collision avoidance assist between the subject vehicle and the target object based on a detection result obtained by the object detection device, a configuration has been disclosed that acquires a position of the target object from a predetermined mounting position, sets a reference point on a road surface around the position of the target object based on a feature amount on the road surface, and calculates movement information on the target object from the position of the target object with reference to the reference point (Japanese Patent No. 5971341).

Furthermore, to improve promptness and accuracy in a road surface estimation device, a configuration has been described that includes a three-dimensional object detecting means for detecting a three-dimensional object in front of a subject vehicle from an image captured by a camera, a lower end position detecting means for detecting a lower end position of the detected three-dimensional object, a temporary road surface calculating means for calculating a temporary road surface from the detected lower end position of the three-dimensional object and a reference position of the subject vehicle, and an actual road surface estimating means for estimating an actual road surface based on the temporary road surface. The three-dimensional object detecting means extracts a longitudinal edge of the three-dimensional object from a longitudinal edge that is extended by a certain length equal to or longer than a predetermined value in the vertical direction within the image captured by the camera. The lower end position detecting means detects the lower end position of the extracted longitudinal edge of the three-dimensional object. The temporary road surface calculating means calculates the temporary road surface by calculating a pitch angle of the subject vehicle from the detected lower end position, the reference position of the subject vehicle, a distance from the camera to the three-dimensional object, and an optical axis of the camera. The actual road surface estimating means estimates the actual road surface based on the calculated pitch angle (Japanese Patent No. 4754434).

SUMMARY OF INVENTION

Technical Problem

When an object region indicating a position, a size, or the like of an object is to be set in a system that recognizes the object based on distance information, such as a disparity, as described above, and if a disparity is detected at a position lower than a position at which the object exists, the object region may be set so as to include a region in which the object does not actually exist. For example, when a vehicle (object) running in front of a subject vehicle passes by a marking on a road surface, and if a disparity is detected in a marking portion, an object region may be set so as to include the marking portion existing below the vehicle in some cases. In this case, an error may occur between an actual object (the vehicle) and a subject (including the vehicle and the marking) handled as the object in the system, and the accuracy of distance measurement, avoidance behaviors, or the like may be reduced. For example, when a distance from a subject vehicle to a vehicle in front of the subject vehicle is calculated based on an average of disparities in the object region, and if the object region is set wider than supposed to be, the calculated distance may be shorter than an actual distance.

The present invention has been made in consideration of the circumstances as described above, and an object is to improve the accuracy of object recognition.

Solution to Problem

According to an embodiment, provided is an information processing device comprising: a setting unit configured to set an object region, for image information obtained by capturing an imaging range, the object region corresponding to an object existing in the imaging range; a luminance information acquiring unit configured to acquire luminance information indicating luminance in the imaging range; and a correcting unit configured to correct the object region based on the luminance information in a luminance detection region that is set in a lower part of the object region.

Advantageous Effects of Invention

According to an aspect of the present invention, it is possible to improve the accuracy of object recognition.

BRIEF DESCRIPTION OF DRAWINGS

FIG. 1 is a diagram illustrating an overall configuration of an apparatus control system according to an embodiment.

FIG. 2 is a schematic diagram illustrating overall configurations of an imaging unit and an image analyzing unit according to the embodiment.

FIG. 3 is a diagram for explaining the principle of calculation of a distance from a disparity value by using the principle of triangulation.

FIG. 4 is a diagram illustrating an example of a functional configuration of the image analyzing unit according to the embodiment.

FIG. 5 is a diagram illustrating an example of a luminance image.

FIG. 6 is a diagram illustrating an example of a disparity image corresponding to the luminance image illustrated in FIG. 5.

FIG. 7 is a diagram illustrating an example of a V map corresponding to the disparity image illustrated in FIG. 6.

FIG. 8 is a diagram illustrating an example of a state in which a shape of a road surface is detected by using the V map illustrated in FIG. 7.

FIG. 9 is a diagram illustrating an example of a real U map corresponding to the disparity image illustrated in FIG. 6.

FIG. 10 is a diagram illustrating an example of a state in which a left end portion and a right end portion of an object region are set by using the real U map illustrated in FIG. 9.

FIG. 11 is a diagram illustrating an example of a state in which an upper end portion and a lower end portion of the object region are set by using the real U map illustrated in FIG. 9.

FIG. 12 is a diagram illustrating an example of a state in which the object region is temporarily set in a luminance image.

FIG. 13 is a diagram illustrating an example of a state in which a luminance detection region is set in the object region.

FIG. 14 is a diagram illustrating an example of a state in which luminance in the luminance detection region is detected and a lower end position of the object region is corrected.

FIG. 15 is a flowchart illustrating a first example of a process of correcting the object region according to the embodiment.

FIG. 16 is a flowchart illustrating a second example of the process of correcting the object region according to the embodiment.

FIG. 17 is a diagram illustrating an example of a luminance histogram.

FIG. 18 is a diagram illustrating an example of a V map when it is detected that a road surface is located at a position lower than a supposed position.

FIG. 19 is a diagram illustrating an example of a V map when an estimated shape of the road surface illustrated in FIG. 18 is corrected.

DESCRIPTION OF EMBODIMENTS

Exemplary embodiments of an information processing device, an imaging device, an apparatus control system, a movable body, an information processing method, and a computer program product according to the present invention will be described in detail below with reference to the drawings. The present invention is not limited by the embodiments below. Configuration elements in the embodiments described below include elements easily conceived by a person skilled in the art, elements substantially the same, and elements within the scope of so-called equivalents. Various omission, replacement, and modifications of the configuration elements may be made within the scope not departing from the gist of the following embodiments.

<Overall Configuration of Apparatus Control System>

FIG. 1 is a diagram illustrating an overall configuration of an apparatus control system 1 according to an embodiment. The apparatus control system 1 is mounted on a subject vehicle 100 (an apparatus) such as an automobile as one example of movable bodies, and includes an imaging device 101, a display monitor 103, and a running control unit 104 (an apparatus control unit). The apparatus control system 1 recognizes a road surface and an object as a detection target in front of the subject vehicle 100 based on captured image data of the front of the subject vehicle 100 captured by the imaging device 101, and causes the running control unit 104 to control a running state or the like of the subject vehicle 100 based on an analysis result of the recognized information. The object is an object to be a target for collision avoidance or the like, and may be a vehicle (an automobile, a motorcycle, a bicycle, or the like), a person, an animal, or a structural object (a guardrail, a utility pole, a curb, a bifurcating block, a falling object, or the like), for example. The apparatus control system 1 of the present embodiment is applicable to not only the automobile but also a movable body, such as an airplane or a robot, and other apparatuses.

The imaging device 101 includes an imaging unit 107 and an image analyzing unit 108 (an information processing device). The imaging unit 107 is a unit that acquires a plurality of pieces of captured image data (luminance information) for a single object, and may be a stereo camera or the like, for example. The imaging unit 107 is installed in an upper portion of a windshield 105 (for example, near a rearview mirror) of the subject vehicle 100, for example. Various kinds of data, such as the captured image data, obtained through imaging by the imaging unit 107 are input to the image analyzing unit 108. The image analyzing unit 108 analyzes data transmitted from the imaging unit 107, and generates an analysis result including information indicating a three-dimensional shape of a road surface on which the subject vehicle 100 is running, information indicating a position, a size, a shape, or the like of the object, or the like. The image analyzing unit 108 sends the analysis result to the display monitor 103 and the running control unit 104. The display monitor 103 displays the captured image data, the analysis result, and the information related to the captured image data and the analysis result, which are obtained by the imaging device 101. The running control unit 104 provides a warning to a driver of the subject vehicle 100 or performs running assist control to automatically control a brake, an accelerator, a steering wheel, or the like of the subject vehicle 100 based on the analysis result obtained by the image analyzing unit 108. Hereinafter, a term "image" will be used; however, the "image" in the present embodiments does not necessarily have to be displayed, and includes a simple aggregate of information that is not displayed on a monitor or the like.

<Overall Configurations of Imaging Unit and Image Analyzing Unit>

FIG. 2 is a schematic diagram illustrating overall configurations of the imaging unit 107 and the image analyzing unit 108 according to the present embodiment.

The imaging unit 107 is a stereo camera including two imaging units 110a and 110b. The two imaging units 110a and 110b are identical to each other. The imaging units 110a and 110b respectively include imaging lenses 111a and 111b, sensor substrates 114a and 114b including image sensors 113a and 113b on which light-receiving elements are arranged two-dimensionally, and signal processing units 115a and 115b that generate and output captured image data (luminance information) by converting analog electrical signals (electrical signals corresponding to the amounts of light received by the light-receiving elements on the image sensors 113a and 113b) output from the sensor substrates 114a and 114b into digital electrical signals.

The imaging unit 107 includes a process hardware unit 120 constructed by a field-programmable gate array (FPGA) or the like. The process hardware unit 120 includes a disparity calculating unit 121 that calculates a disparity value of a corresponding image portion between the captured images captured by the imaging units 110a and 110b, in order to obtain disparity information from luminance information output from each of the imaging units 110a and 110b.

The disparity value described herein is obtained such that, by using one of the captured images (luminance images) captured by the imaging units 110a and 110b as a reference image and using the other one of the captured images as a comparison image, an amount of positional deviation of an image portion of the comparison image with respect to an image portion on the reference image is calculated as the disparity value of the image portions, where the image portions correspond to an identical point (a local region of an object) in an imaging region. A distance from the imaging unit 107 (the subject vehicle 100) to the local region of the object can be calculated from the disparity value by using the principle of triangulation.

FIG. 3 is a diagram for explaining the principle of calculation of a distance from the disparity value by using the principle of triangulation. In FIG. 3, f denotes a focal length of each of the imaging lenses 111a and 111b, D denotes a distance between optical axes, and Z denotes a distance from the imaging lenses 111a and 111b to an object 301 (a distance in a direction parallel to the optical axes). In this drawing, imaging positions of a certain point O (a local region) of the object 301 on a left image and a right image are located at distances $\Delta1$ and $\Delta2$ from imaging centers. A disparity value d in this case is defined such that $d=\Delta1+\Delta2$.

Referring back to FIG. 2, the image analyzing unit 108 includes an image processing board or the like, and includes a storage unit 122 constructed by a random access memory (RAM), a read only memory (ROM), or the like for storing the luminance information and the disparity information output from the imaging unit 107, a central processing unit (CPU) 123 that executes a computer program for performing a recognition process on a recognition target, disparity calculation control, or the like, a data interface (I/F) 124, and a serial I/F 125.

The FPGA of the process hardware unit 120 generates information on a disparity image by performing, on the luminance information, a process required to be executed in real time, such as gamma correction, distortion correction (parallelization of the left captured image and the right captured image), or disparity calculation by block matching, and writes the information to the RAM of the image analyzing unit 108. The CPU 123 of the image analyzing unit 108 controls an image sensor controller of each of the imaging units 110a and 110b and controls the entire image processing board. Furthermore, the CPU 123 loads a three-dimensional object detection program for executing a process of detecting a three-dimensional shape of a road surface, a process of detecting an object, or the like from the ROM, executes various processes by using the luminance information or the disparity information stored in the RAM as input, and outputs a processing result to the outside from the data I/F 124 or the serial I/F 125. In the case of executing the processes as described above, it may be possible to input vehicle operation information, such as a vehicle speed, acceleration (mainly acceleration in a front-back direction of the subject vehicle), a steering angle, or a yaw rate of the subject vehicle 100, by using the data I/F 124, and use the vehicle operation information as a parameter for various processes. The data output to the outside is used as input data for performing various kinds of control (brake control, vehicle speed control, steering control, or warning control) on the subject vehicle 100.

<Functional Configuration of Image Analyzing Unit>

FIG. 4 is a diagram illustrating an example of a functional configuration of the image analyzing unit 108 according to the present embodiment. The image analyzing unit 108 includes a distance information acquiring unit 51, a luminance information acquiring unit 52, a distance image generating unit 53, a road surface shape detecting unit 54 (a detecting unit), an object region setting unit 55 (a setting unit), a correcting unit 56, an analyzing unit 57, and an output unit 58.

The distance information acquiring unit 51 is a functional unit that acquires distance information indicating a distance between the subject vehicle 100 in which the imaging unit 107 is mounted and an object existing in an imaging range of the imaging unit 107. The distance information in the present embodiment is the disparity information acquired by the imaging unit 107 that is a stereo camera; however, the distance information is not limited thereto. The distance information acquiring unit 51 is constructed by cooperation of the storage unit 122, the CPU 123, a program stored in the storage unit 122, or the like.

The luminance information acquiring unit 52 is a functional unit that acquires luminance information indicating luminance in the imaging range of the imaging unit 107. The luminance is brightness of a surface of an object with a width, and may be brightness on a road surface, brightness of a surface of an object, such as a vehicle, or the like. The luminance information acquiring unit 52 is constructed by cooperation of the storage unit 122, the CPU 123, a program stored in the storage unit 122, or the like.

The distance image generating unit 53 is a functional unit that generates distance image data (disparity image data in the present embodiment) indicating a distance image (a disparity image in the present embodiment) indicating a distance distribution in the imaging range, based on the distance information (disparity information in the present embodiment). The distance image generating unit 53 is constructed by cooperation of the storage unit 122, the CPU 123, and a program stored in the storage unit 122, or the like.

FIG. 5 is a diagram illustrating an example of a luminance image 61. FIG. 6 is a diagram illustrating an example of a disparity image 71 corresponding to the luminance image 61 illustrated in FIG. 5. The luminance image 61 is an image generated based on the luminance information acquired by the imaging unit 107 (a captured image captured by the imaging unit 107). The disparity image 71 is an image that is generated based on the disparity information generated by the disparity calculating unit 121 of the imaging unit 107 and that indicates a distribution of disparities (distances). The luminance image 61 of the present embodiment includes a road surface 62, a vehicle 63, and a road marking 64 representing a crossing. Therefore, the disparity image 71 includes a road surface corresponding region 72 corresponding to the road surface 62, a vehicle corresponding region 73 corresponding to the vehicle 63, and a road marking corresponding region 74 corresponding to the road marking 64.

The road surface shape detecting unit 54 is a functional unit that detects a shape of the road surface 62 on which the subject vehicle 100 is moving, based on the distance information. The road surface shape detecting unit 54 is constructed by cooperation of the storage unit 122, the CPU 123, a program stored in the storage unit 122, or the like.

A method of detecting the shape of the road surface 62 is not specifically limited; however, for example, a method using a V-Disparity map (a V map) may be employed. FIG. 7 is a diagram illustrating an example of a V map 81 corresponding to the disparity image 71 illustrated in FIG. 6. FIG. 8 is a diagram illustrating an example of a state in which the shape of the road surface 62 is detected by using the V map 81 illustrated in FIG. 7. Hereinafter, those represented as a "map" in the present embodiment means a simple aggregate of information.

The V map 81 is generated such that the y-axis represents the coordinate of a vertical axis of the disparity image 71, the horizontal axis represents a disparity, and a value (x, y, d) of each of pixels of the disparity image 71 is voted at a corresponding coordinate position on the V map 81. That is, assuming that the disparity image is information in which a vertical position, a horizontal position, and a depth position of an object are associated with one another, the V map is information in which the vertical position and the depth position of the object are associated with each other. By generating the V map 81 as described above, a road surface disparity region 82 corresponding to the road surface 62 and a vehicle disparity region 83 corresponding to the vehicle 63 appear in the V map 81. Therefore, each of pixel values in the V map 81 indicates a frequency value of a disparity. In the V map 81 as described above, frequency values are searched for from below, and a candidate point is selected for each column as illustrated in FIG. 8. The shape of the road surface 62 can be obtained by obtaining an approximate line by applying a least squares method to a group of the selected candidate points. For example, when an equation Y=a×X+b is obtained as an approximate line, and if a disparity value corresponding to a certain distance D from the subject vehicle 100 is denoted by d, a height Y (a value on the y-axis) of the road surface 62 in the disparity image 71 or the luminance image 61 is obtained such that Y=a× d+b. With repetition of this operation, it is possible to detect the shape of the road surface 62.

More specifically, with respect to an object that appears in a portion corresponding to a certain point at a y-axis position of y' with a certain disparity value d in the luminance image, a height of the object from a road surface can be calculated by (y'−y0), where y0 denotes a y-axis position with the disparity value d on the approximate line. In general, a height H of an object corresponding to the coordinates (d, y') on the V map from the road surface can be calculated by Equation (1) below. In Equation (1) below, "z" is a distance (z=BF/(d-offset)) calculated from the disparity value d, and "f" is a value obtained by converting the focal length of the camera to a value with the same unit as (y'−y0). Here, "BF" is a value obtained by multiplying the baseline length by the focal length of the stereo camera, and "offset" is a disparity value obtained by capturing the object at infinity.

$$H = z \times (y' - y0)/f \qquad (1)$$

The object region setting unit 55 is a functional unit that sets an object region corresponding to the object (the vehicle 63) in the distance image (the disparity image 71) based on the distance information (the disparity information). The object region setting unit 55 is constructed by cooperation of the storage unit 122, the CPU 123, a program stored in the storage unit 122, or the like.

A method of setting the object region is not specifically limited; however, for example, a method using a real U map may be employed. The real U map described herein is a map that represents a real space in a look-down view manner (a bird's eye view image, a look-down view image, or the like), and is one example of look-down view information. A functional unit that generates the look-down view information may be included in the object region setting unit 55, or may be configured as an independent functional unit. FIG. 9 is a diagram illustrating an example of a real U map 91 corresponding to the disparity image 71 illustrated in FIG. 6. FIG. 10 is a diagram illustrating an example of a state in which a left end portion and a right end portion of an object region 77 are set by using the real U map 91 illustrated in FIG. 9. FIG. 11 is a diagram illustrating an example of a state in which an upper end portion and a lower end portion of the object region 77 are set by using the real U map 91 illustrated in FIG. 9.

The real U map 91 is generated from a disparity image, a frequency U map, or a height U map. The frequency U map is a two-dimensional x-y histogram, in which the x-axis represents x, the y-axis represents d, and the z-axis represents a frequency for a combination (x, y, d) of the x-axis position, the y-axis position, and the disparity value d of each of the pixels of the disparity image 71. The height U map is a two-dimensional x-y histogram, in which the x-axis represents x, the y-axis represents d, and the z-axis represents a height from the road surface for a combination (x, y, d) of the x-axis position, the y-axis position, and the disparity value d of each of the pixels of the disparity image 71. That is, assuming that the disparity image is information in which a vertical position, a horizontal position, and a depth position of an object are associated with one another, the frequency U map and the height U map are information in which the horizontal position and the depth position of the object are associated with each other. The real U map 91 is a two-dimensional x-y histogram, in which the x-axis (the horizontal axis) represents an actual distance obtained by converting a value on the x-axis of the frequency U map or the height U map into an actual distance, the y-axis (the vertical axis) represents a decimated disparity value obtained by decimating a disparity of the frequency U map or the height U map in accordance with a distance, and the z-axis represents the frequency of the frequency U map or the height of the height U map. The real U map 91 illustrated in FIG. 9 is generated from the frequency U map, and the z-axis thereof represents the frequency. A method of generating the real U map is not limited to the above-described example as long as the real U map is a look-down view image.

In the real U map 91 as described above, frequency values of a pixel group corresponding to a position in which the object, such as the vehicle 63, exists among pixels included in the real U map 91 are increased. Therefore, an isolated region 93 corresponding to the object (the vehicle 63) appears in the real U map 91.

As illustrated in FIG. 10, it is possible to set the left end portion and the right end portion of the object region 77 in the luminance image 61 or the disparity image 71 based on the isolated region 93 in the real U map 91. The object region 77 in the present embodiment indicates a position and a size of the object (the vehicle 63) by a rectangle. That is, the object region 77 is information in which the central position, the height, and the width of the object are associated with one another, for example. Positions of the left end portion and the right end portion of the object region 77 can be determined by converting positions of a left end portion and a right end portion of the isolated region 93 on the real U map 91 to coordinates of the luminance image 61 or the disparity image 71. The coordinates of the luminance image 61 and the coordinates of the disparity image 71 uniquely correspond to each other; therefore, the object region 77 can be freely converted between both of the images 61 and 71. The isolated region may be detected by detecting a region to which an identical ID (label) is assigned through a well-known labeling process.

As illustrated in FIG. 11, it is possible to set the upper end portion and the lower end portion of the object region 77 in the disparity image 71 based on the isolated region 93 in the real U map 91. The upper end portion of the isolated region 93 detected on the real U map 91 is a portion with the smallest disparity and the longest distance. The lower end portion of the isolated region 93 is a portion with the largest disparity and the shortest distance. The longest distance and the shortest distance can be obtained respectively from a disparity of the upper end portion and a disparity of the lower end portion. When positions of the upper end portion and the lower end portion of the object region 77 on the disparity image 71 are to be determined, portions in which disparities continue in a range between the longest distance and the shortest distance are detected, and, a disparity continuing portion located in the upper part can be estimated as an upper end position and a disparity continuing portion located in the lower part can be estimated as a lower end position. In this case, when the vehicle 63 is passing on the road marking 64 for example, disparities are generated in a portion in which the road marking 64 exists; therefore, the lower end position of the object region 77 may be set so as to include the road marking 64 (the road surface 62) in some cases.

FIG. 12 is a diagram illustrating an example of a state in which the object region 77 is temporarily set in the luminance image 61. As described above, the object region setting unit 55 recognizes that portions in which the disparities continue in the vertical direction correspond to the end portions of the object region 77. Therefore, when the object region 77 is set for the vehicle 63 passing on the road marking 64, the object region may be set so as to include a part of the road surface 62 in which the road marking 64 is painted, beyond the lowermost portion of the vehicle 63 (a contact point between wheels and the road surface 62).

The object region 77 may be set by using the luminance information instead of the distance information. For example, there is a method in which a template image of an object determined in advance is used such that a search is performed on the luminance image while changing a size of the template image, and a position at which the degree of match with the template image is the highest is detected and set. However, it is less likely that the template and an actual detection target completely match with each other, and in some cases, the object region 77 may be set so as to include the periphery of the detection target. That is, even when the object region 77 is set by using the luminance information, the object region may be set so as to include a part of the road surface 62 in which the road marking 64 is painted, beyond the lowermost portion of the vehicle 63 (a contact point between wheels and the road surface 62).

The above-described problem with the lower end position of the object region 77 significantly occurs especially when the object region 77 is set by using the look-down view image such as the real U map. This is because information on the vertical position is lost in the look-down view image and an error is likely to occur when the lowermost portion (the vertical position) of the object is determined. The look-down view image is advantageous in terms of a processing speed or the like because the amount of information is smaller than the distance image or the like, but it is likely to cause the above-described problem. The problem with the lower end position of the object region 77 as described above can be solved by a function of the correcting unit 56 as described below.

The correcting unit 56 is a functional unit that corrects the object region 77 based on luminance information in a luminance detection region set in a lower part within the object region 77. The correcting unit 56 is constructed by cooperation of the storage unit 122, the CPU 123, a program stored in the storage unit 122, or the like.

FIG. 13 is a diagram illustrating an example of a state in which a luminance detection region 78 is set in the object region 77. The luminance detection region 78 is a region from the lower end position of the object region 77, which is temporarily set based on the disparity information (including information deviated from the disparity information (e.g., the V map 81, the U map, the real U map 91, or the like)), to an upper position at a predetermined distance D from the lower end position. The distance D is a distance including a predetermined number of pixel rows in the luminance image 61, for example. The distance D may be a fixed value or a value that varies depending on predetermined conditions. The correcting unit 56 corrects the lower end position of the object region 77 based on the luminance information in the luminance detection region 78.

FIG. 14 is a diagram illustrating an example of a state in which luminance in the luminance detection region 78 is detected and the lower end position of the object region 77 is corrected. The correcting unit 56 of the present embodiment calculates average luminance (row average luminance) for each pixel row in order from the lowest to the highest pixel row of the luminance detection region 78. For example, row average luminance of a first pixel row 85 illustrated in FIG. 14 is larger than row average luminance of a second pixel row 86. This is because of an influence of a shadow 89 formed under the vehicle 63. Therefore, the row average luminance decreases as the position of the pixel row goes up.

The correcting unit 56 corrects the lower end position of the object region 77 so as to shift to a position of a pixel row in which the row average luminance is smaller than a predetermined value. A method of setting the predetermined value is not specifically limited; however, for example, a method based on comparison with average luminance in the entire luminance detection region 78 (entire average luminance) may be employed. For example, when a ratio of the row average luminance to the entire average luminance becomes smaller than a predetermined value (for example, 50%), the lower end position of the object region 77 may be corrected so as to be shifted to the position of the corresponding pixel row. For example, in the example illustrated in FIG. 14, when the row average luminance of the first pixel row 85 is equal to or larger than a predetermined value (for example, 50% of the entire average luminance) but the row average luminance of the second pixel row 86 is smaller than the predetermined value, the lower end position of the object region 77 is corrected so as to be shifted to the position of the second pixel row 86.

FIG. 15 is a flowchart illustrating a first example of a process of correcting the object region 77 according to the embodiment. The distance image generating unit 53 generates disparity image data indicating the disparity image 71 (one example of the distance image) based on the disparity information acquired from the distance information acquiring unit 51 (Step S201). Subsequently, the object region setting unit 55 sets the temporary object region 77 on the disparity image 71 and the luminance image 61 based on the disparity information (Step S202).

Then, the correcting unit 56 sets the luminance detection region 78 in the temporary object region 77 (Step S203). Subsequently, the correcting unit 56 calculates entire average luminance L1 in the luminance detection region 78 (Step S204). Then, the correcting unit 56 calculates row average luminance L2 for each of pixel rows in order from the lowermost row of the luminance detection region 78 (Step S205). Subsequently, the correcting unit 56 determines whether an expression L2×K1<L1 is true, that is, whether a ratio of the row average luminance L2 to the entire average luminance L1 is smaller than a predetermined value (for example, 50%, i.e., K1=0.5) (Step S206).

If the expression L2×K1<L1 is true (YES at Step S206), the lower end position of the object region 77 is corrected so as to be shifted to a position of the current pixel row (Step S207). In contrast, if the expression L2×K1<L1 is not true (NO at Step S206), it is determined whether all of the pixel rows in the luminance detection region 78 are scanned (Step S208). If all of the pixel rows are scanned (YES at Step S208), the routine is terminated. If all of the pixel rows are not scanned (NO at Step S208), the process returns to Step S205.

According to the correction process as described above, it is possible to set the object region 77 with high accuracy by using the fact that the luminance on the lower side of the object (the vehicle 63) is smaller than the luminance of other portions due to the influence of the shadow 89 of the object itself.

FIG. 16 is a flowchart illustrating a second example of the process of correcting the object region 77 according to the embodiment. In the correction process of the second example, Step S301 and Step S302 are performed between Step S204 and Step S205 in the first example of the correction process illustrated in FIG. 15.

The correcting unit 56 according to the second example calculates the entire average luminance L1 in the luminance detection region 78 (Step S204), and thereafter generates a luminance histogram, in which the number of pixels with luminance larger than the entire average luminance L1 is counted for each of the pixel rows in the luminance detection region 78 (Step S301).

FIG. 17 is a diagram illustrating an example of a luminance histogram 95. In the luminance histogram 95, a threshold T1 calculated from a theoretically possible maximum value (a theoretical maximum value) is indicated. When a maximum value of the luminance histogram 95 is larger than the threshold T1, the correcting unit 56 according to the second example corrects the lower end position of the object region 77.

The correcting unit 56 according to the second example determines whether the maximum value of the luminance histogram 95 is larger than the threshold T1 (Step S302). If the maximum value of the luminance histogram 95 is not larger than the threshold T1 (NO at Step S302), the routine is terminated. If the maximum value of the luminance histogram 95 is larger than the threshold T1 (YES at Step S302), the processes at Step S205 and later are performed.

In the correction process according to second example, the object region 77 is corrected only when the maximum value of the luminance histogram 95 is larger than the threshold T1. This is because it is assumed that the lower end position of the object region 77 is further extended downward with an increase in the number of pixels with high luminance in the lower part of the object region 77. When the maximum value of the luminance histogram 95 is small, it is likely that the amount of downward extension of the lower end position of the object region 77 is small; therefore, in such a case, the correction process is not performed. With this configuration, it becomes possible to prevent execution of an unnecessary correction process and reduce a calculation load or the like.

The correcting unit 56 may correct the shape of the road surface 62, which is detected by the road surface shape detecting unit 54, based on the lower end position of the object region 77 corrected as described above.

FIG. 18 is a diagram illustrating an example of the V map 81 when it is detected that the road surface 62 is located at a position lower than a supposed position. In FIG. 18, a state is illustrated in which a noise disparity 97 caused by the road marking 64 is detected below the vehicle disparity region 83 corresponding to the vehicle 63, and an estimated line 88 indicating an estimated shape of the road surface 62 is deviated downward from the supposed position.

FIG. 19 is a diagram illustrating an example of the V map 81 when the estimated shape of the road surface 62 illustrated in FIG. 18 is corrected. As a method of correcting the road surface shape, a method of correcting the estimated line 88 so as to pass through a point (d, Y) without changing an intercept, for example. The disparity value d and the y-coordinate position Y are values corresponding to the lower end position of the corrected object region 77.

The road surface shape corrected as described above may be used in various ways. For example, it may be possible that a deviation amount between the lower end position of the corrected object region 77 and a detected road surface shape is stored for each of frames, and when the object region 77 is continuously corrected for a predetermined number of frames or greater, the road surface shape modified in advance may be used to detect the road surface in a next frame. Furthermore, when a plurality of objects exist in the imaging region, and if the object region 77 and the road surface shape are corrected for one of the objects, information such as the corrected lower end position of the object region 77, the corrected road surface shape, or the like may be used to set the object region 77 for the other objects, for example. With this configuration, it is possible to reduce a calculation load or the like.

The analyzing unit 57 is a functional unit that analyzes a pixel value in the object region 77 based on information on the object region 77 set as described above, the detected road surface shape, or the like, and generates analysis data indicating an analysis result. The analysis result may be various information; for example, a distance from the subject vehicle 100 to the object (the vehicle 63 or the like), a relative moving speed between the subject vehicle 100 and the object, an expected traveling direction of the object, or the like. The analyzing unit 57 is constructed by cooperation of the storage unit 122, the CPU 123, a program stored in the storage unit 122, or the like.

The output unit 58 is a functional unit that outputs the analysis data generated by the analyzing unit 57 to an external system (the display monitor 103, the running control unit 104, or the like). The output unit 58 is constructed by cooperation of the storage unit 122, the CPU 123, the data OF 124, the serial OF 125, a program stored in the storage unit 122, or the like.

According to the above-described embodiment, it is possible to set the object region 77, which indicates a position, a size, or the like of an object to be a target for collision avoidance or the like, with high accuracy. Therefore, it becomes possible to improve the accuracy of running control of the subject vehicle 100.

While the embodiments and modifications of the present invention have been described above, the present invention is not limited by the embodiments and modifications. The embodiments and modifications may be changed or modified without departing from the gist and the scope of the present invention.

REFERENCE SIGNS LIST

1 Apparatus control system
51 Distance information acquiring unit
52 Luminance information acquiring unit
53 Distance image generating unit
54 Road surface shape detecting unit
55 Object region setting unit
56 Correcting unit
57 Analyzing unit
58 Output unit
61 Luminance image
62 Road surface
63 Vehicle
64 Road marking
71 Disparity image
72 Road surface corresponding region
73 Vehicle corresponding region
74 Road marking corresponding region
77 Object region
78 Luminance detection region
81 V map
82 Road surface disparity region
83 Vehicle disparity region
85 First pixel row
86 Second pixel row
88 Estimated line
91 Real U map
93 Isolated region
95 Luminance histogram
97 Noise disparity
100 Subject vehicle
101 Imaging device
103 Display monitor
104 Running control unit
105 Windshield
107 Imaging unit
108 Image analyzing unit
110a, 110b Imaging unit
111a, 111b Imaging lens
113a, 113b Image sensor
114a, 114b Sensor substrate
115a, 115b Signal processing unit
120 Process hardware unit
301 Object

CITATION LIST

Patent Literature

PTL 1: Japanese Patent No. 5971341
PTL 2: Japanese Patent No. 4754434

The invention claimed is:

1. An information processing device, comprising:
processing circuitry configured to
set an initial object region within image information obtained by capturing an imaging range, the initial object region corresponding to an object existing in the imaging range;
acquire luminance information indicating luminance in the imaging range; and
adjust the initial object region to obtain an adjusted object region based on the acquired luminance information within a luminance detection region that is set in a lower part of the initial object region,
wherein the processing circuitry is further configured to
acquire distance information indicating a distance between the object and an apparatus equipped with a stereo camera that acquires the image information and generates look-down view information based on the distance information, wherein the distance information is disparity information,
set the initial object region based on the look-down view information,
set the initial object region in a disparity image indicating a distribution of disparities in the imaging range based on the disparity information,
generate U map data indicating a U map, in which a combination of a first axial position, a second axial position, and a disparity in the disparity image is converted to two-dimensional histogram information, based on the disparity information,
generate real U map data indicating a real U map, in which a first axis in the U map is converted to an actual distance and the disparity on a second axis is converted to a decimated disparity value at a decimation rate corresponding to the actual distance, based on the U map data, and
detect an isolated region corresponding to the object in the real U map, and set the initial object region based on the isolated region.

2. The information processing device according to claim 1, wherein the processing circuitry is further configured to set the initial object region based on the luminance information.

3. The information processing device according to claim 1, wherein the processing circuitry is further configured to adjust the initial object region based on a region in which luminance indicated by the acquired luminance information is smaller than a predetermined value within the luminance detection region.

4. The information processing device according to claim 1, wherein the processing circuitry is further configured to:
determine whether the object is a vehicle, and
when the object is determined to be the vehicle, adjust the initial object region based on the luminance information within the luminance detection region.

5. The information processing device according to claim 1 wherein the processing circuitry is further configured to:
detect a shape of a road surface based on the distance information, and
correct the shape of the road surface based on a lower end position of the adjusted object region.

6. An imaging device comprising the information processing device according to claim 1.

7. An apparatus control system comprising:
the information processing device according to claim 1; and an apparatus control circuit configured to control an operation of an apparatus based on information in the adjusted object region.

8. A movable body comprising:
the apparatus control system according to claim 7, wherein the movable body is controlled by the apparatus control circuit.

9. The information processing device of claim 1, wherein the processing circuitry is further configured to adjust a location of the bottom boundary of the initial object region based on a comparison between an average luminance of at least one row of pixels in the luminance detection region and an average luminance of all pixels within the luminance detection region.

10. An information processing method, comprising:
setting an initial object region within image information obtained by capturing an imaging range, the initial object region corresponding to an object existing in the imaging range;
acquiring luminance information indicating luminance in the imaging range; and
adjusting the initial object region to obtain an adjusted object region, based on the acquired luminance information in a luminance detection region set within a lower part of the initial object region, wherein the method further comprises
acquiring distance information indicating a distance between the object and an apparatus equipped with a stereo camera that acquires the image information and generates look-down view information based on the distance information, wherein the distance information is disparity information;
setting the initial object region based on the look-down view information;
setting the initial object region in a disparity image indicating a distribution of disparities in the imaging range based on the disparity information;
generating U map data indicating a U map, in which a combination of a first axial position, a second axial position, and a disparity in the disparity image is converted to two-dimensional histogram information, based on the disparity information;
generating real U map data indicating a real U map, in which a first axis in the U map is converted to an actual distance and the disparity on a second axis is converted to a decimated disparity value at a decimation rate corresponding to the actual distance, based on the U map data; and
detecting an isolated region corresponding to the object in the real U map, and setting the initial object region based on the isolated region.

11. A computer program product comprising a non-transitory computer-readable recording medium having stored therein a program that causes a computer to execute a method, comprising:
setting an initial object region within image information obtained by capturing an imaging range, the initial object region corresponding to an object existing in the imaging range;
acquiring luminance information indicating luminance in the imaging range; and
adjusting the initial object region to obtain an adjusted object region, based on the acquired luminance information in a luminance detection region set within a lower part of the initial object region, wherein the method further comprises
acquiring distance information indicating a distance between the object and an apparatus equipped with a stereo camera that acquires the image information, and generates look-down view information based on the distance information, wherein the distance information is disparity information;
setting the initial object region based on the look-down view information;
setting the initial object region in a disparity image indicating a distribution of disparities in the imaging range based on the disparity information;
generating U map data indicating a U map, in which a combination of a first axial position, a second axial position, and a disparity in the disparity image is converted to two-dimensional histogram information, based on the disparity information;
generating real U map data indicating a real U map, in which a first axis in the U map is converted to an actual distance and the disparity on a second axis is converted to a decimated disparity value at a decimation rate corresponding to the actual distance, based on the U map data, and
detecting an isolated region corresponding to the object in the real U map, and setting the initial object region based on the isolated region.

* * * * *